(12) United States Patent
Ricci

(10) Patent No.: US 8,468,632 B1
(45) Date of Patent: Jun. 25, 2013

(54) TACTICAL ACCESS RAMP

(76) Inventor: Gabriel J. Ricci, Huntington Beach, CA (US)

( * ) Notice: Subject to any disclaimer, the term of this patent is extended or adjusted under 35 U.S.C. 154(b) by 0 days.

(21) Appl. No.: 13/467,481

(22) Filed: May 9, 2012

(51) Int. Cl.
*E01D 1/00* (2006.01)

(52) U.S. Cl.
USPC .......................................... 14/69.5; 193/41

(58) Field of Classification Search
USPC ........................................ 14/69.5; 193/38, 41
See application file for complete search history.

(56) References Cited

U.S. PATENT DOCUMENTS

| 2,822,940 | A |   | 2/1958 | Kopaska |
| 5,277,436 | A | * | 1/1994 | Frank et al. ................ 280/5.2 |
| 6,119,634 | A | * | 9/2000 | Myrick ...................... 119/847 |
| 6,267,082 | B1 |   | 7/2001 | Naragon et al. |
| 7,082,637 | B1 | * | 8/2006 | Griffin ........................ 14/69.5 |
| 7,299,517 | B1 | * | 11/2007 | Adinolfe ..................... 14/69.5 |
| 8,117,994 | B1 |   | 2/2012 | Goodlow |
| 2006/0260550 | A1 |   | 11/2006 | Dietz |

FOREIGN PATENT DOCUMENTS

| AU | 2006100115 | 3/2006 |
| CH | 692465 | 7/2002 |
| DE | 19806102 | 8/1999 |
| DE | 19842307 | 3/2000 |
| DE | 202004017793 | 2/2005 |
| DE | 202005019016 | 6/2006 |
| DE | 202006004426 | 6/2006 |
| DE | 102005019551 | 11/2006 |
| FR | 2938681 | 5/2010 |
| WO | 2007062425 | 5/2007 |
| WO | 2010125097 | 11/2010 |

\* cited by examiner

*Primary Examiner* — Raymond W Addie
(74) *Attorney, Agent, or Firm* — Rick Barnes

(57) ABSTRACT

A tactical access ramp has an upper and a lower section that are connected by a hinge. Optional upper and lower extension sections and arms are available to extend the length of the ramp. Feet are connected to the lower section, or to the lower extension section or lower extension arms if provided, and provide a stable base for the ramp on the lower surface on which it is deployed. A landing section is connected to the upper section, or to the upper extension section or upper extension arms if provided. The landing section has a landing platform that engages an upper surface, and reduces slippage between the ramp and the upper surface. In this manner, animals and personnel are provided with a stable means of ascent from the lower surface to the upper surface.

20 Claims, 11 Drawing Sheets

TACTICAL ACCESS RAMP

FIELD

This invention relates to the field of tactical equipment. More particularly, this invention relates to a ramp for humans and animals, such as to gain access between different levels.

INTRODUCTION

Peace-keepers, such as police officers, the military, and other service personnel, often have a need to traverse land and structures that are hazardous for one or more reasons. For example, police officers might have need of a safe and secure pathway over a fence or other barrier. A police service animal, such as a dog, might have need to access one level of a structure from another. Humans or animals might need to cross over a section of land that has a pit, or is otherwise dangerous, such as when broken glass or hazardous substances are found thereon.

As a specific example, police service dogs are often deployed to search a structure. Dogs are very adept at handling a variety of different terrain and structures. However, a dog will typically need assistance in gaining access to a portion of a structure such as an attic, when the only access might otherwise be through a ladder. Additionally, if stairs between levels are not available for some reason, it is likewise difficult for dogs or officers to safely ascend or descent from one level to another.

One method of providing access for a police dog to an upper level is for the officers to have the dog stand on a surface, such as a table or a riot shield, and then for the officers to lift the animal up to an opening into the upper level. However, this is somewhat dangerous, as the surface could tip, causing the animal to lose its balance. In addition, during such a procedure, the officers would tend to have their attention focused on the process of raising the animal, rather than on more important matters, such as what might be happening around them. In such situations, even the smallest distractions could prove disastrous.

What is needed, therefore, is a system that reduces problems such as those described above, at least in part.

SUMMARY

The above and other needs are met by a ramp having an upper surface and a lower surface. The ramp includes a main section with an upper section having a hinged end and a distal end, a lower section having a hinged end and a distal end, and a hinge connecting the hinged end of the upper section to the hinged end of the lower section. The hinge is constructed such that the upper and lower sections can be folded together in a substantially parallel configuration, with the lower surfaces of the upper and lower sections facing one another, and the upper and lower sections cannot be folded together such that the upper surfaces of the upper and lower sections form less than a one hundred and eighty degree angle.

A landing section has a riser section with a first end and a second end, and a first hinge connecting the first end of the riser section to the distal end of the upper section. The first hinge is constructed such that the riser and upper sections can be folded together in a substantially parallel configuration, with the lower surfaces of the upper and riser sections facing one another. The first hinge has a lock to retain the upper and riser sections in a desired angular position. A landing platform has a first end and a second end, and gripping structures depending from the lower surface of the landing platform. A second hinge connects the second end of the riser section to the first end of the landing platform. The second hinge is constructed such that the riser and landing platforms can be folded together in a substantially parallel configuration, with the lower surfaces of the retaining and riser sections facing one another. The second hinge has a lock to retain the retaining and riser sections in a desired angular position.

Some embodiment include a lower extension section having a first end and a second end, with the second end of the lower extension section slidably connected to the distal end of the lower section such that the lower extension section slides out from the lower section, such that when the lower extension section is extended, the total length of the lower section and the lower extension section is about twice the length of the lower section alone, and when the lower extension section is retracted, the total length of the lower section and the lower extension section is about the length of the lower section alone. The lower extension section has a lock that engages the lower section and retains the lower extension section at a desired length of extension from the lower section.

Some embodiments include an upper extension section disposed between the upper section and the landing section. The upper extension section has a first end and a second end, with the first end of the upper extension section slidably connected to the distal end of the upper section such that the upper extension section slides out from the upper section, such that when the upper extension section is extended, the total length of the upper section and the upper extension section is about twice the length of the upper section alone, and when the upper extension section is retracted, the total length of the upper section and the upper extension section is about the length of the upper section alone. The upper extension section has a lock that engages the upper section and retains the upper extension section at a desired length of extension from the upper section. The second end of the upper extension section connected by the first hinge to the landing section.

Some embodiments include lower extension arms having first ends and second ends, with the second ends of the lower extension arms slidably connected to the distal end of the lower section such that the lower extension arms slide out from the lower section, such that when the lower extension arms are extended, the total length of the lower section and the lower extension arms is about twice the length of the lower section alone, and when the lower extension arms are retracted, the total length of the lower section and the lower extension arms is about the length of the lower section alone. The lower extension arms have a lock that engages the lower section that retains the lower extension arms at a desired length of extension from the lower section.

Some embodiments include upper extension arms disposed between the upper section and the landing section. The upper extension arms have first ends and second ends, with the first ends of the lower extension arms slidably connected to the distal end of the upper section such that the upper extension arms slide out from the upper section, such that when the upper extension arms are extended, the total length of the upper section and the upper extension arms is about twice the length of the upper section alone, and when the upper extension arms are retracted, the total length of the upper section and the upper extension arms is about the length of the upper section alone. The upper extension arms have a lock that engages the upper section for retaining the upper extension arms at a desired length of extension from the upper section. The second end of the upper extension arms are connected by the first hinge to the landing section.

In some embodiments, feet are connected to the distal end of the lower section, where the feet are constructed such that they can rotate to an angle between the ramp and a surface on which the feet rest, and the feet have gripping structures to grip the surface, where the gripping structures include at least one of spikes, pads, claws, teeth, and combinations of such. In some embodiments, the hinge between the upper and lower sections has a lock to retain the upper and lower sections in a desired angular position. In some embodiments, the gripping structures of the landing platform include at least one of spikes, pads, claws, teeth, and combinations of such.

In some embodiments, rigid teeth extend outward from the second end of the landing platform. In some embodiments, the ramp when extended is about twenty inches wide, less than about three inches thick, and about twelve feet long, and the ramp when folded is about twenty inches wide, less than about nine inches thick, and about three feet long. In some embodiments, the sections of the ramp are formed of at least one of aluminum, titanium, and rigid composite materials, and the hinges are formed of at least one of titanium and steel. In some embodiments, the ramp weighs no more than about fifty pounds. In some embodiments, the ramp can hold a load of up to about four hundred pounds.

According to another aspect of the invention there is described a ramp having an upper surface and a lower surface, and a main section with an upper section having a hinged end and a distal end, a lower section having a hinged end and a distal end, and a hinge connecting the hinged end of the upper section to the hinged end of the lower section. The hinge is constructed such that the upper and lower sections can be folded together in a substantially parallel configuration, with the lower surfaces of the upper and lower sections facing one another, and the upper and lower sections cannot be folded together such that the upper surfaces of the upper and lower sections form less than a one hundred and eighty degree angle.

A lower extension section has a first end and a second end, with the second end of the lower extension section slidably connected to the distal end of the lower section such that the lower extension section slides out from the lower section, such that when the lower extension section is extended, the total length of the lower section and the lower extension section is about twice the length of the lower section alone, and when the lower extension section is retracted, the total length of the lower section and the lower extension section is about the length of the lower section alone. The lower extension section have a lock that engages the lower section and retains the lower extension section at a desired length of extension from the lower section.

Lower extension arms have first ends and second ends, with the second ends of the lower extension arms slidably connected to the first end of the lower extension section such that the lower extension arms slide out from the lower extension section, such that when the lower extension arms are extended, the total length of the lower extension section and the lower extension arms is about twice the length of the lower extension section alone, and when the lower extension arms are retracted, the total length of the lower extension section and the lower extension arms is about the length of the lower extension section alone. The lower extension arms have a lock that engages the lower extension section and retains the lower extension arms at a desired length of extension from the lower extension section.

Feet are connected to the first ends of the lower extension arms, where the feet are constructed such that they can rotate to an angle between the ramp and the surface on which the feet rest. The feet have gripping structures to grip the surface, where the gripping structures including at least one of spikes, pads, claws, teeth, and combinations of such.

An upper extension section has a first end and a second end, with the first end of the upper extension section slidably connected to the distal end of the upper section such that the upper extension section slides out from the upper section, such that when the upper extension section is extended, the total length of the upper section and the upper extension section is about twice the length of the upper section alone, and when the upper extension section is retracted, the total length of the upper section and the upper extension section is about the length of the upper section alone. The upper extension section has a lock that engages the upper section and retains the upper extension section at a desired length of extension from the upper section.

Upper extension arms have first ends and second ends, with the first ends of the upper extension arms slidably connected to the second end of the upper extension section such that the upper extension arms slide out from the upper extension section, such that when the upper extension arms are extended, the total length of the upper extension section and the upper extension arms is about twice the length of the upper extension section alone, and when the upper extension arms are retracted, the total length of the upper extension section and the upper extension arms is about the length of the upper extension section alone. The upper extension arms have a lock that engages the upper extension section and retains the upper extension arms at a desired length of extension from the upper extension section.

A landing section has a riser section with a first end and a second end. First hinges connect the first end of the riser section to the second ends of the upper extension arms, where the first hinges are constructed such that the riser section and upper extension arms can be folded together in a substantially parallel configuration, with the lower surfaces of the riser section and the lower extension arms facing one another. The first hinges have a lock to retain the upper extension arms and riser section in a desired angular position.

A landing platform has a first end and a second end, with gripping structures depending from the lower surface of the landing platform. A second hinge connects the second end of the riser section to the first end of the landing platform. The second hinge is constructed such that the riser and landing platforms can be folded together in a substantially parallel configuration, with the lower surfaces of the retaining and riser sections facing one another. The second hinge has a lock to retain the retaining and riser sections in a desired angular position.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

Figure 1:
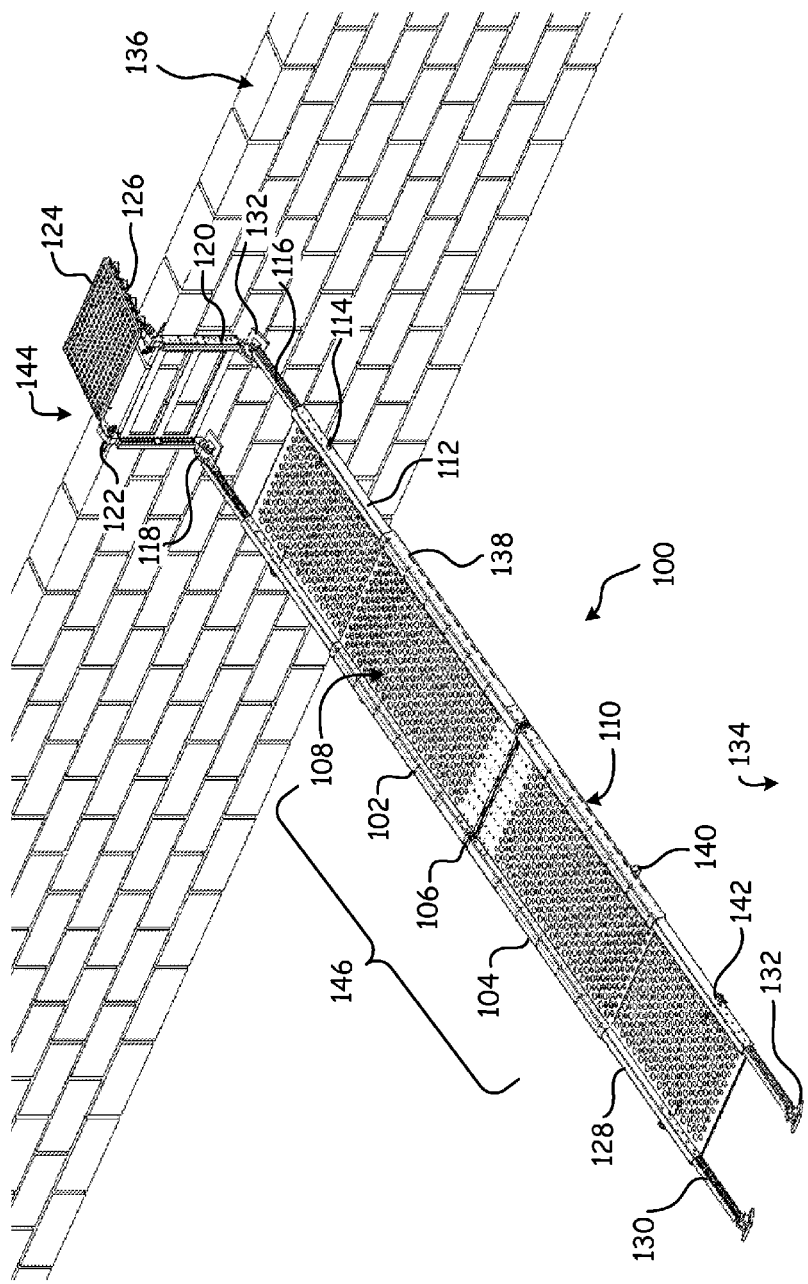
FIG. 1 is a perspective view of a fully extended access ramp according to an embodiment of the invention.

With reference now to FIG. 1, there is depicted a ramp 100 according to an embodiment of the present invention. As depicted in FIG. 1, the ramp 100 is fully extended, with feet 132 resting on the ground 134, and a landing section 144 deployed atop a wall 136. The embodiments of the ramp 100 as described herein thus provide for safe ascent of both animals and personnel from one level to another, or across hazardous portions of terrain. In the example as depicted in FIG. 1, the ascent is from the ground 134 to the top of the wall 136. However, in other embodiments the ascent could be from one level of a structure to another level of the structure, such as from one floor of a house to an attic of the house. In other embodiments, the ramp 100 could provide secure access between buildings. Obviously, the ramp 100 also provides a safe means for descending between two levels as well. Other uses of the ramp 100 are contemplated herein.

The ramp 100 in the embodiment as depicted in FIG. 1 is comprised of several different elements that function together to provide the stability that is desired in a tactical situation, or in other situations in which a stable surface is desired. The ramp 100 has an upper surface 108 and a lower surface 110. The upper surface 108 is the load-bearing surface of the ramp 100, and basically includes all of the surfaces of the various elements that are pointing up or away from the wall 136 as depicted in FIG. 1. The lower surface 110 includes all of the opposite surfaces of the various elements of the ramp 100, such as those that are pointing down or toward the wall 136 in the embodiment as depicted in FIG. 1, and in typical deployment are not anticipated to be load-bearing. However, some load-bearing use of the bottom surface 110 of the ramp 100 could be made in some situations.

Figure 11:
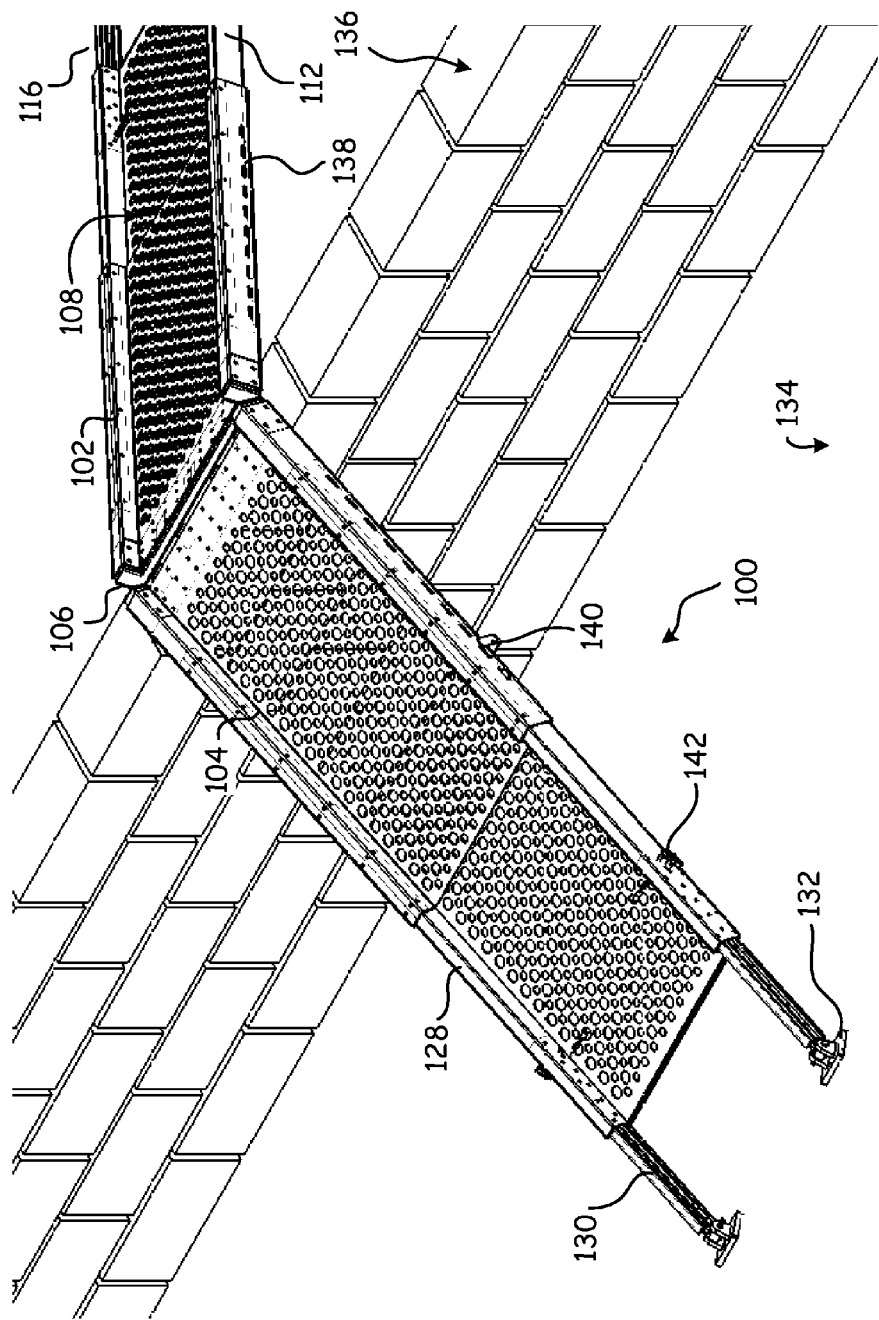
FIG. 11 is a perspective view of a deployed access ramp according to an embodiment of the invention.
Figure 12:
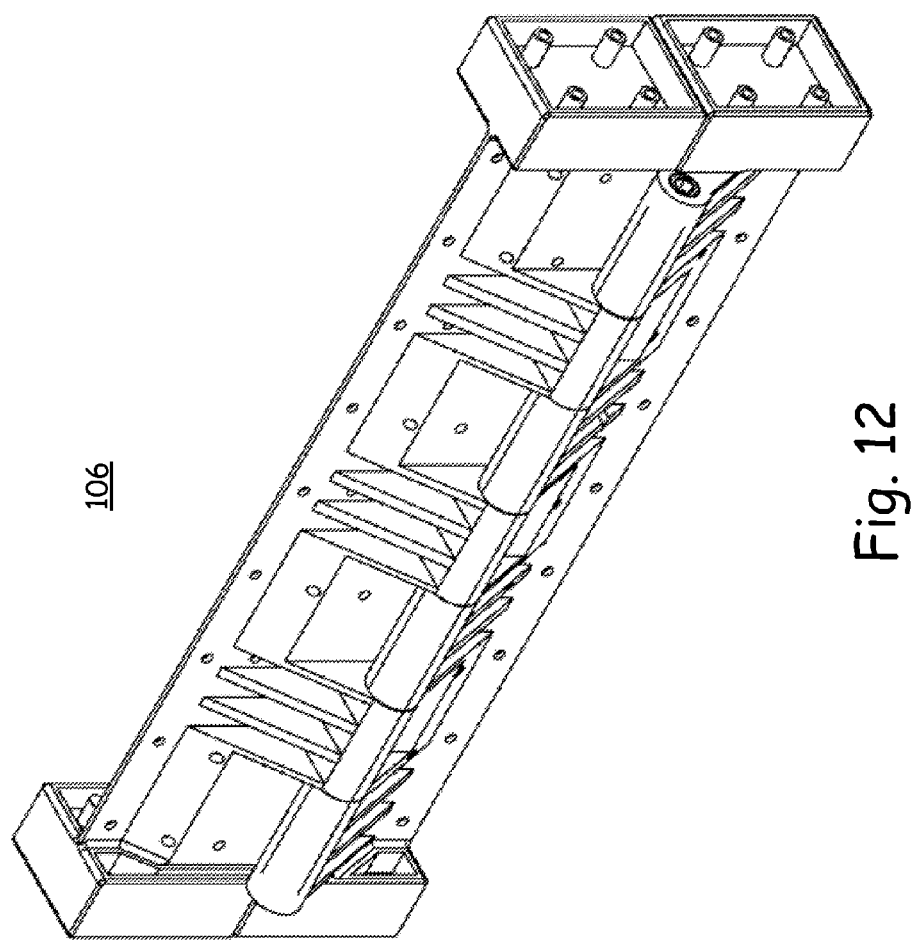
FIG. 12 is a perspective view of a hinge according to an embodiment of the invention.

The main section 146 of the ramp 100 is formed of an upper section 102 and a lower section 104, that are joined together by a hinge 106. One embodiment of the hinge 106 is depicted in FIG. 12. The hinge 106 is designed so as to either lock into a desired position, or otherwise stop in a desired position and not bend any further. The desired position is as depicted in FIG. 1, with the upper section 102 and the lower section 104 disposed in a planar arrangement, one with the other, and forming a substantially flat surface. While the main section 146 can bend at the hinge 106 in one direction (as depicted in FIG. 11), the construction of the hinge 106 does not permit the main section 146 to bend in the other direction, so that the main section 146 of the ramp 100 can bear a load on the upper surface 108 when it is deployed as depicted. Thus, the upper surfaces 108 of the main section 146 cannot be brought to an angle that is less than about one hundred and eighty degrees. In some embodiments, the length of the lower section 104 is about the same as the length of the upper section 102.

In the embodiment as depicted, a lower extension section 128 slides in and out of the lower section 104. A locking mechanism 140, such as a tab that fits into a selection of slots, is used to lock the lower extension section 128 at the desired length of extension, be it fully extended, partially extended, or not extended at all. The lower section 104 and the lower extension section 128 are constructed and connected together such that no substantial bending occurs between them. In some embodiments, the lower extension section 128 is about the same length as the lower section 104. In this manner, when the lower extension section 128 is fully extended, the total length of the lower section 104 and the lower extension section 128 is about twice the length of the lower section 104 alone. However, when the lower extension section 128 is completely retracted into the lower section 104, the total length is not substantially more than about the length of the lower section 104 alone.

Also in the embodiment as depicted, lower extension arms 130 slide in and out of the lower extension section 128. Locking mechanisms 142, such as tabs or pins that fit into a selection of slots or holes, are used to lock the lower extension arms 130 at the desired length of extension, be it fully extended, partially extended, or not extended at all. The lower extension arms 130 can be independently extended, so as to provide stability on uneven terrain or surfaces 134 on which the ramp 100 might be deployed. The lower extension arms 130 and the lower extension section 128 are constructed and connected together such that no substantial bending occurs between them. In some embodiments, the lower extension section 128 is about the same length as the lower extension arms 130. In this manner, when the lower extension arms 130 are fully extended, the total length of the lower extension section 128 and the lower extension arms 130 is about twice the length of the lower extension section 128 alone. However, when the lower extension arms 130 are completely retracted into the lower extension section 128, the total length is not substantially more than about the length of the lower extension section 128 alone.

In the embodiment as depicted, feet 132 are connected at the ends of the lower extension arms 130. One purpose of the feet 132 is to provide additional stability to the ramp 100, by reducing the occurrence of slipping between the ramp 100 and the surface 134 on which the ramp 100 is deployed. The feet 132 can also help keep the ramp 100 stable by reducing the occurrence of the lower extension arms 130 from sinking into the surface 134, in those cases where the surface 134 might be formed of a relatively soft substance. Thus, the feet 132 can be constructed in a variety of different configurations. For example, the feet 132 can be formed of pads, as depicted in FIG. 1, or spikes, claws, teeth, or combinations of all such. The feet 132 in some embodiments are connected to the lower extension arms 130 by swivels, so that they can find the plane of the surface 134. The feet 132 can be formed of a variety of different materials, such as metals, rubbers, or thermoplastic resins, as desired for the terrain 134 on which the ramp 100 is anticipated to be deployed.

In various embodiments, one or more of the lower extension section 128, lower extension legs 130, and feet 132 are not present in the ramp 100. For example, the feet 132 in some embodiments are connected directly to the lower section 104, or directly to the lower extension section 128. In some embodiments, no feet 132 are provided, and one of either the lower section 104 or the lower extension section 128 is deployed directly on the terrain 134.

As depicted in the embodiment of FIG. 1, an upper extension section 112 slides in and out of the upper section 102. A locking mechanism 138, such as a tab that fits into a selection of slots, is used to lock the upper extension section 112 at the desired length of extension, be it fully extended, partially extended, or not extended at all. The upper section 102 and the upper extension section 112 are constructed and connected together such that no substantial bending occurs between them. In some embodiments, the upper extension section 112 is about the same length as the upper section 102. In this manner, when the upper extension section 112 is fully extended, the total length of the upper section 102 and the upper extension section 112 is about twice the length of the upper section 102 alone. However, when the upper extension section 112 is completely retracted into the upper section 102, the total length is not substantially more than about the length of the upper section 102 alone.

Also as depicted in the embodiment of FIG. 1, upper extension arms 116 slide in and out of the upper extension section 112. Locking mechanisms 114, such as tabs or pins that fit into a selection of slots or holes, are used to lock the upper extension arms 116 at the desired length of extension, be it fully extended, partially extended, or not extended at all. The upper extension arms 116 can be independently extended, so as to provide stability on uneven structures 136, against which the ramp 100 might be deployed. The upper extension arms 116 and the upper extension section 112 are constructed and connected together such that no substantial bending occurs between them. In some embodiments, the upper extension section 112 is about the same length as the upper extension arms 116. In this manner, when the upper extension arms 116 are fully extended, the total length of the upper extension section 112 and the upper extension arms 116 is about twice the length of the upper extension section 112 alone. However, when the upper extension arms 116 are completely retracted into the upper extension section 112, the total length is not substantially more than about the length of the upper extension section 112 alone.

Hinges 118 are connected to the ends of the upper extension arms 116, and connect the upper extension arms 116 to the landing section 144. The hinges 118 in some embodiments have locks—such as pins that fit into holes, or teeth that engage and can be clamped into position—to retain the hinges 118 in a desired position that provides a desired angle between the upper extension arms 116 and the landing section 144. However, in some embodiments the hinges 118 can be configured to not lock, so that the angle between the upper extension arms 116 and the landing section 144 can float as circumstances may require.

In the embodiment as depicted in FIG. 1, feet 132 are also connected at the ends of the upper extension arms 116. One purpose of the feet 132 is to provide additional stability to the ramp 100 when it is deployed in a manner where the upper extension arms 116 are also deployed against a surface, such as in the situation indicated in FIG. 11, where the ramp 100 provides a stable pathway across the wall 136 and back to the ground 134, or otherwise. The stability is provided by reducing the occurrence of slipping between the ramp 100 and the surface 134 (or otherwise) on which the ramp 100 is deployed. The feet 132 can also help keep the ramp 100 stable by reducing the occurrence of the upper extension arms 6 from sinking into the surface 134, in those cases where the surface 134 might be formed of a relatively soft substance. Thus, the feet 132 can be constructed in a variety of different configurations. For example, the feet 132 can be formed of pads, as depicted in FIG. 1, or spikes, claws, teeth, or combinations of all such. The feet 132 in some embodiments are connected to the upper extension arms 116 by swivels, so that they can find the plane of the surface 134. The feet 132 can be formed of a variety of different materials, such as metals, rubbers, or thermoplastic resins, as desired for the terrain 134 on which the ramp 100 is anticipated to be deployed.

In various embodiments, one or more of the upper extension section 112, the upper extension legs 116, and the feet 132 are not present in the ramp 100. For example, the hinges 118 in some embodiments are connected directly to the upper section 102, or directly to the upper extension section 112. In some embodiments, the feet 132 are not present at the ends of the upper extension arms 116.

In the embodiment as depicted in FIG. 1, the landing section 144 includes a riser section 120, a landing platform 124, and hinges 122 that connect the riser section 120 to the landing platform 124. The hinges 122 have locks—such as pins that fit into holes, or teeth that engage and can be clamped into position—to retain the hinges 122 into a desired position that provides a desired angle between the riser section 120 and the landing platform 124. By locking the hinges 122 in place, the desired angle between the landing platform 124 and the rest of the ramp 100 can be maintained. This provides a great deal of stability to the ramp 100.

As depicted, the hinges 118 are connected to the riser section 120. However, in some embodiments the riser section 120 and the hinges 122 are not provided, and the landing platform 124 is connected directly to the hinges 118. In such an embodiment, the hinges 118 would have the characteristics as described above for the hinges 122, and would not have an option where they float freely, because the locking aspect of the hinges (either 122 or 118) that connect to the landing platform 124 is an element that adds a great deal of stability to the ramp 100.

Gripping structures 126 are provided on the lower surface 110 of landing platform 124. The gripping structures 126 engage and retain the surface 136 against which the landing platform 124 is deployed, and reduce the occurrence of slipping between the ramp 100 and the surface 136. The gripping structures 126 can be constructed in a variety of different configurations. For example, the gripping structures 126 can be formed of teeth, as depicted in FIG. 1, or spikes, claws, or combinations of all such. The gripping structures 126 can be formed of a variety of different materials, such as metals, rubbers, or thermoplastic resins, as desired for the surface 136 on which the ramp 100 is anticipated to be deployed.

Figure 2:
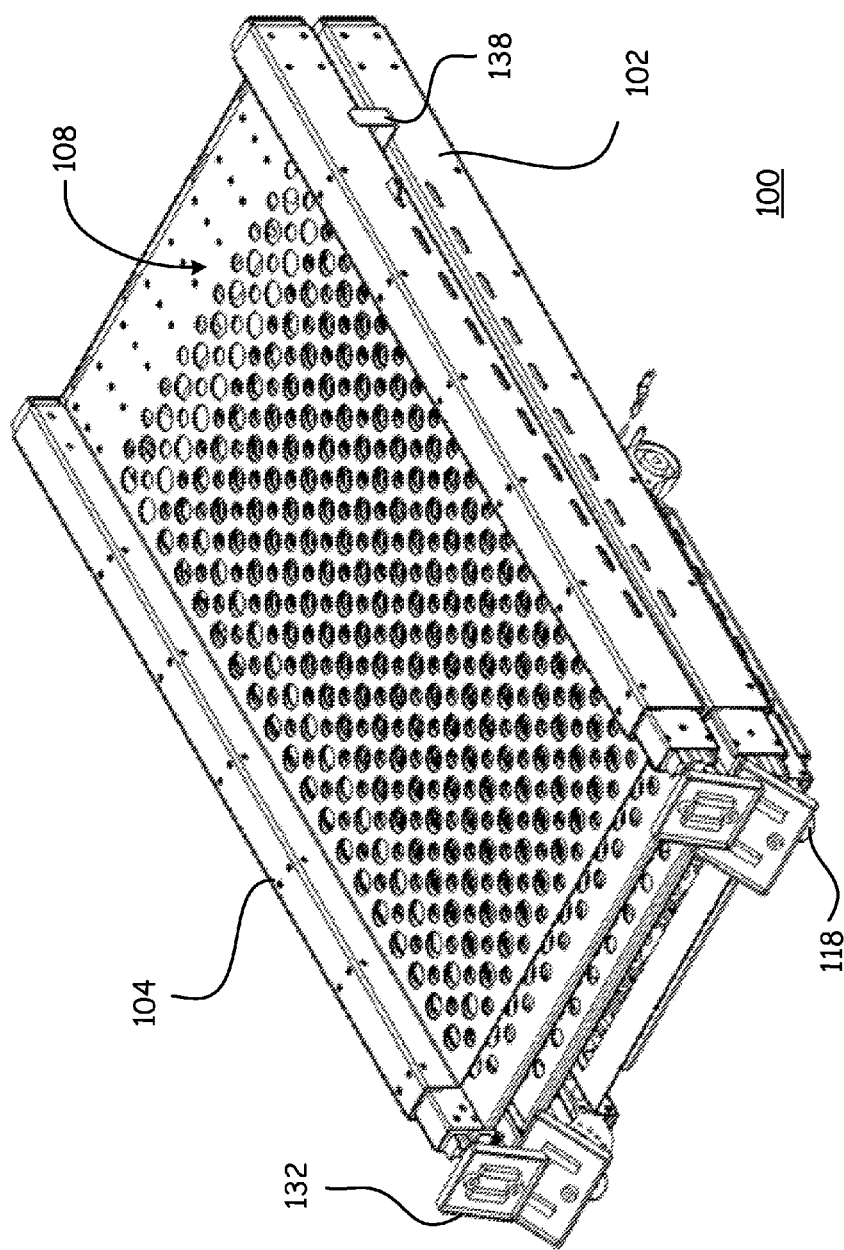
FIG. 2 is a perspective view of a folded access ramp according to an embodiment of the invention.

Whereas the ramp 100 has heretofore been described in a completely extended configuration and with primary reference to FIG. 1, the manner in which it is extended from its compact collapsed configuration, as depicted in FIG. 2, is now described. As seen in FIG. 2, the various sections of the ramp 100 fold and collapse such that substantially the entirety of the ramp 100 is contained between the lower section 104 and the upper section 102, with what has been called the upper surface 108 now disposed on the outside of the collapsed ramp 100, and the lower surfaces 110 of both the upper and lower sections 102 and 104 facing each other (with other sections disposed therebetween). This is accomplished by the construction of the hinge 106 that is disposed between the upper section 102 and the lower section 104, which hinge 106 is not visible in the view of FIG. 2, but is hidden at the upper right of the ramp 100 as depicted.

Figure 3:
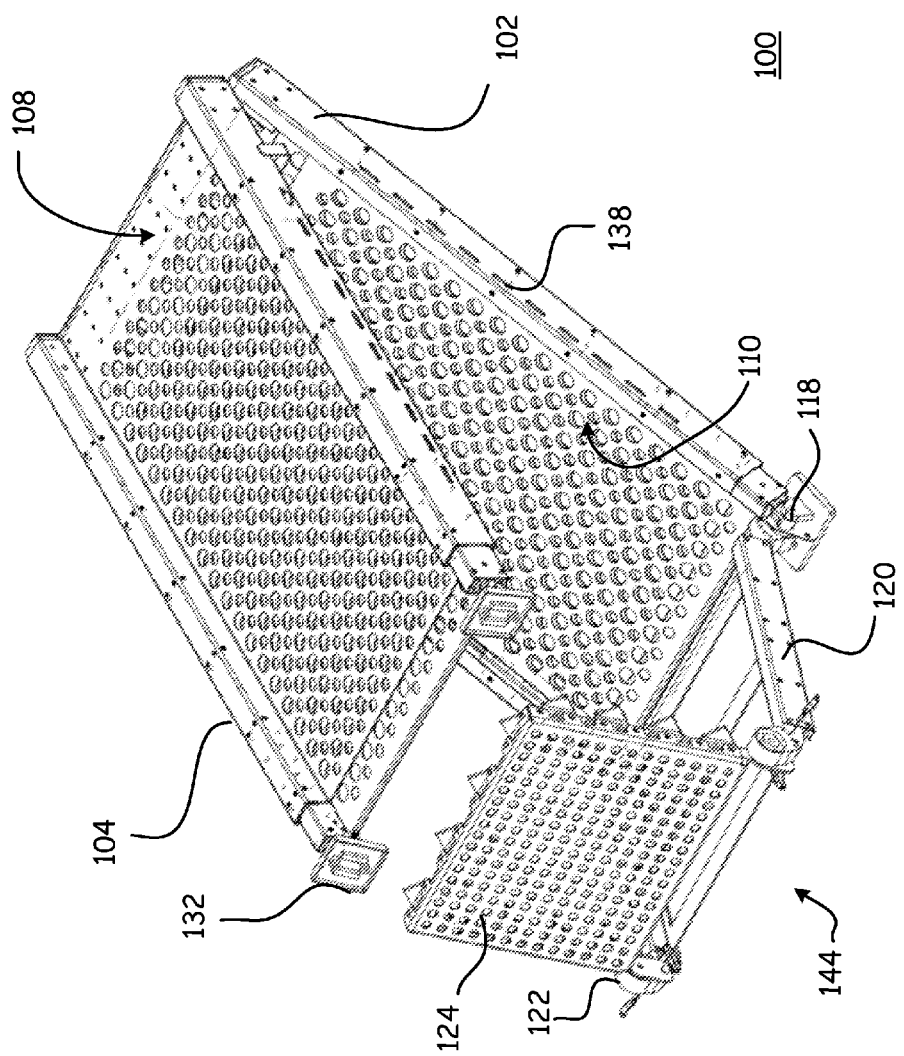
FIG. 3 is a perspective view of a first position in unfolding an access ramp according to an embodiment of the invention.

FIG. 3 depicts the ramp 100, where the following changes have been made from the fully compacted configuration as depicted in FIG. 2. First, the lower section 104 is slightly unfolded from the upper section 102 by means of the hinge 106 (still not depicted in this view), and the landing section 144 is unfolded from between the upper and lower sections 102 and 104 by operation of the hinges 118. This process starts to reveal the lower surfaces 110 of the upper and lower sections 102 and 104, which face one another when the ramp 100 is completely collapsed.

Figure 4:
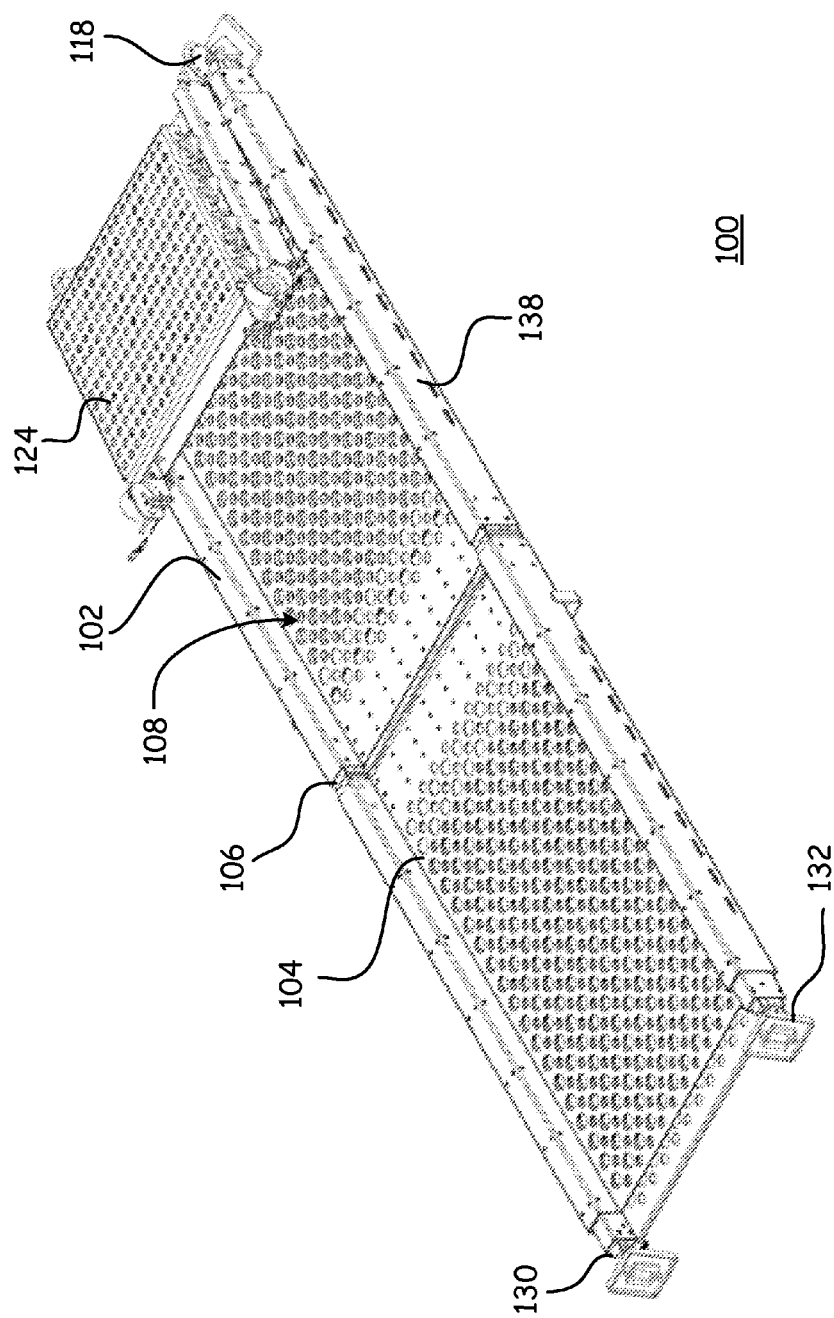
FIG. 4 is a perspective view of a second position in unfolding an access ramp according to an embodiment of the invention.
Figure 5:
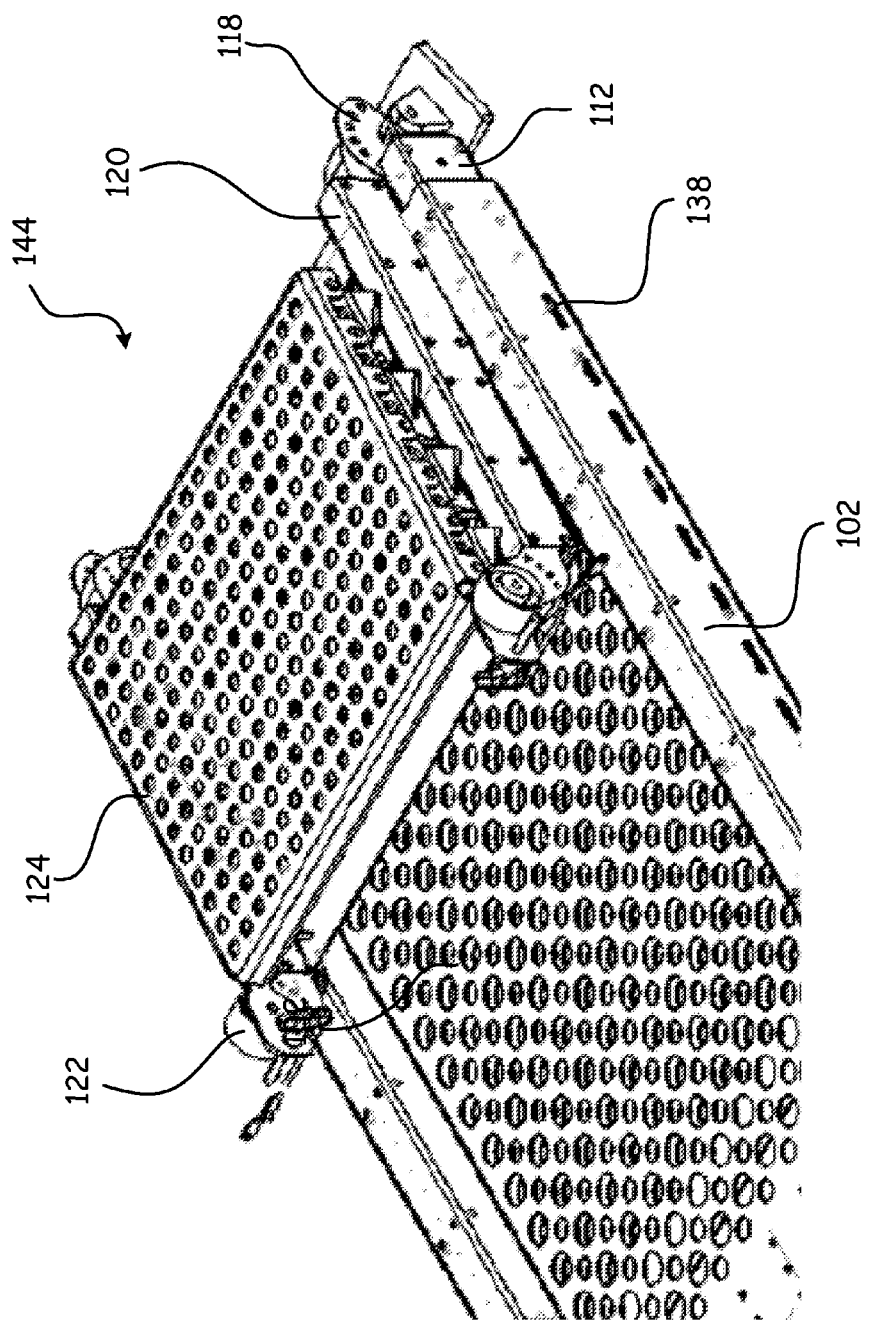
FIG. 5 is a detailed perspective view of a folded landing portion of an access ramp according to an embodiment of the invention.
Figure 6:
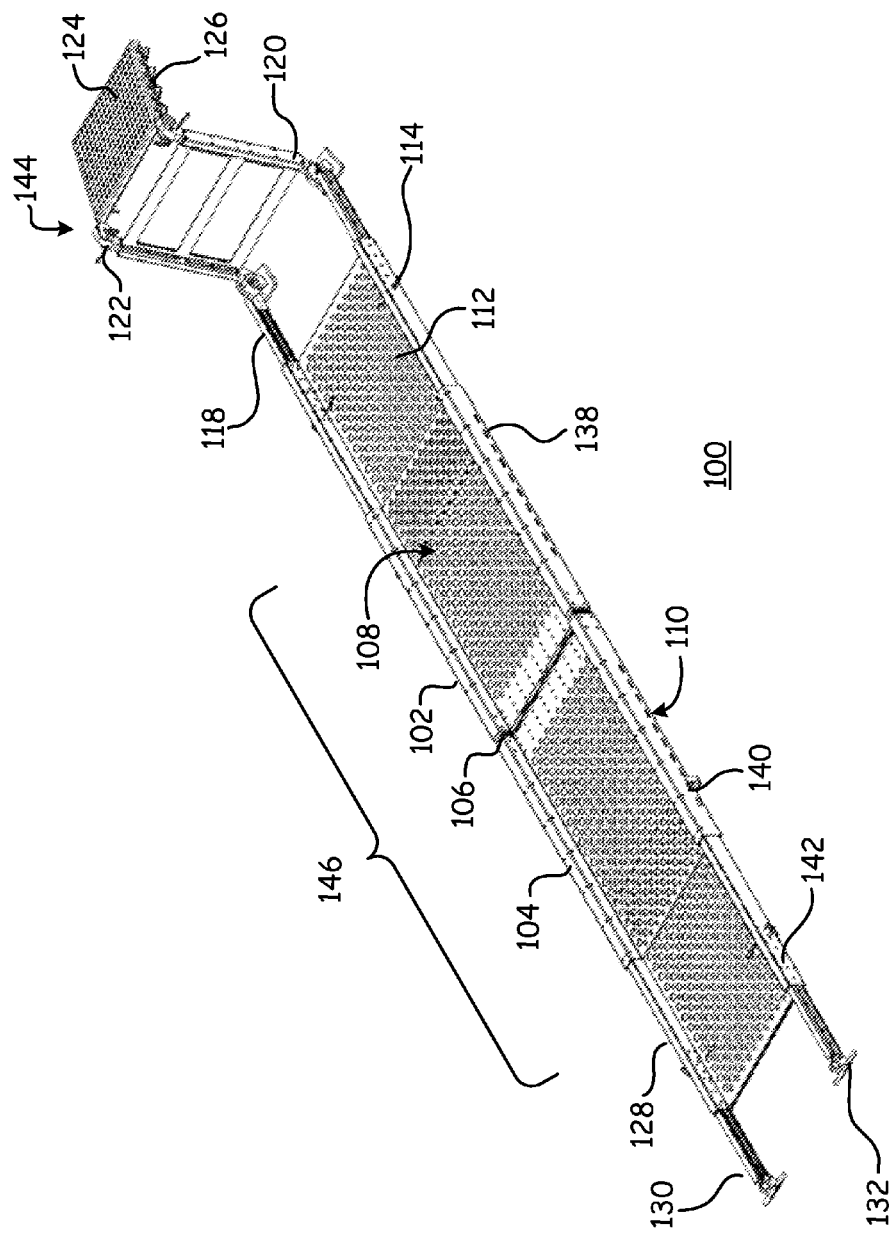
FIG. 6 is a perspective view of an extended access ramp according to an embodiment of the invention.

In FIG. 4, the lower section 104 has remained in place, and the upper section 102 has been completely rotated underneath the lower section 104 to the stopping position of the hinge 106, such that the upper and lower sections 102 and 104 now form the flat and planar upper surface 108. As previously described, the hinge 106 is either constructed such that it cannot rotate any further past this position, or is lockable in this position. FIG. 5 provides a closer look at the folded landing section 144. FIG. 6 depicts the landing section 144 completely unfolded, with the hinges 122 and 118 in a position where there are either fully rotated, or in a position where they are lockable. The upper and lower extension sections 112 and 128 have also been extended in this view.

Figure 7:
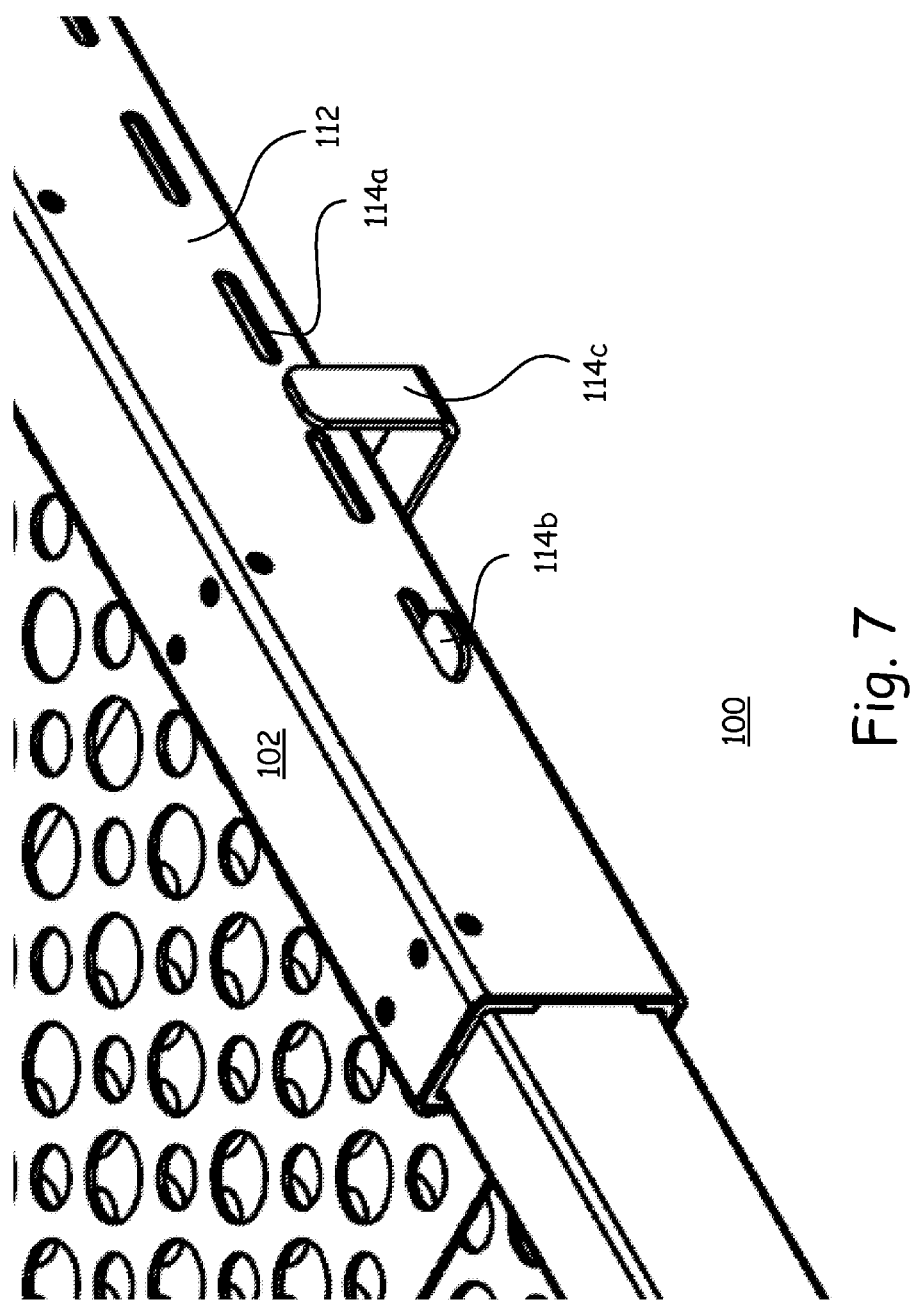
FIG. 7 is a detailed perspective view of an extension locking mechanism of an access ramp according to an embodiment of the invention.

FIG. 7 depicts some detail on the lock 114 between the upper section 102 and the upper extension section 112. In the embodiment as depicted in FIG. 7, the lock 114 takes the form of a spring tab 114b that can be retracted by means of the lever 114c, so that the tab 114b can be placed in one of a selection of slots 114a, thereby enabling the upper extension section 112 to be retracted to and locked at different lengths of extension. The other extension locks 142, 140, 138, 114 as described herein can also be configured with this same construction. In other embodiments, these locks 114, 138, 140, and 142 are constructed as pins that fit in holes, or lock-knobs on screws that slide along slots. Other embodiments are also contemplated.

Figure 8:
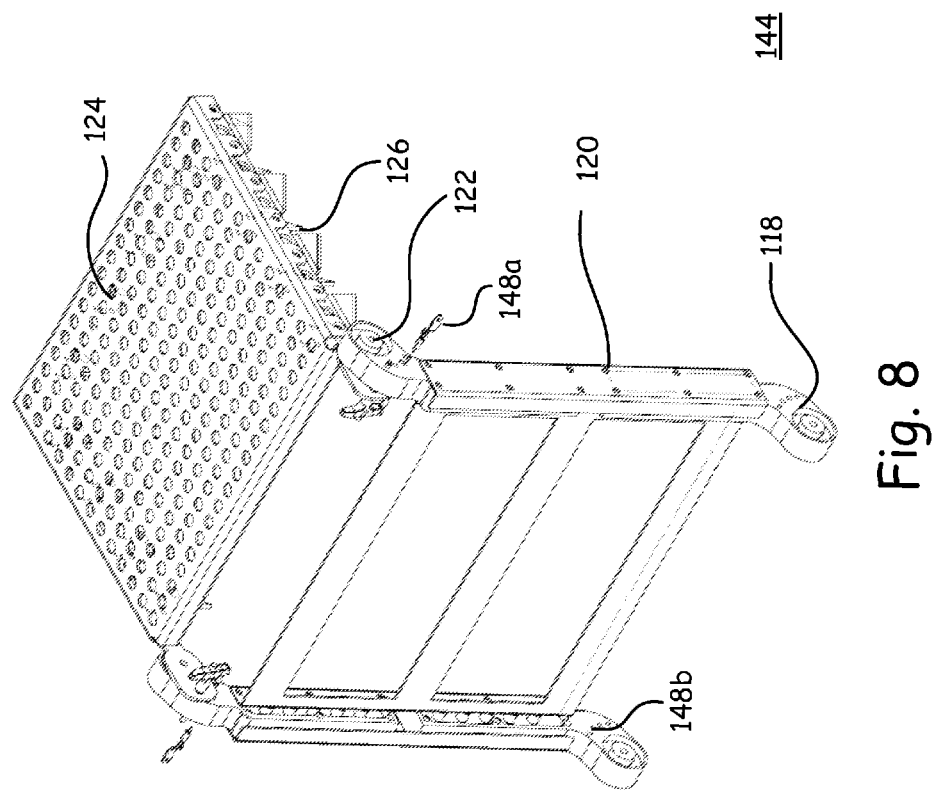
FIG. 8 is a first detailed perspective view of a landing portion of an access ramp according to an embodiment of the invention.
Figure 9:
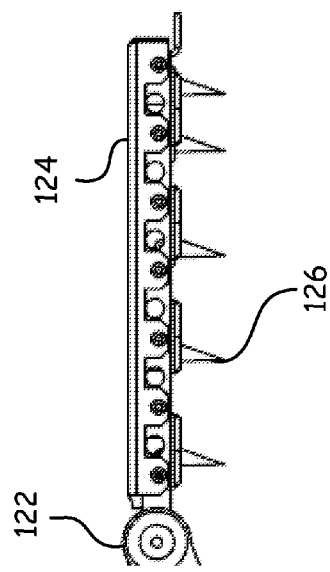
FIG. 9 is a second detailed elevation view of a landing portion of an access ramp according to an embodiment of the invention.
Figure 10:
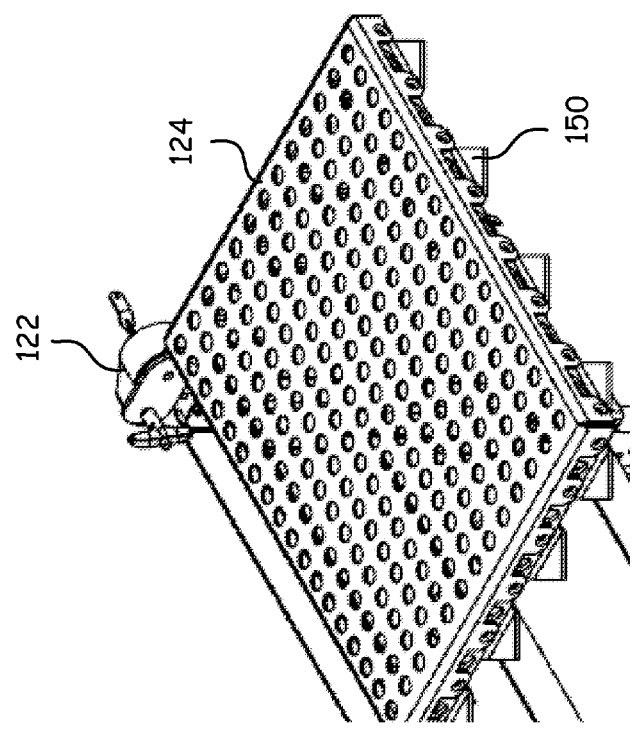
FIG. 10 is a third detailed perspective view of a landing portion of an access ramp according to an embodiment of the invention.

FIGS. 8-10 provide additional detail in regard to the landing section 144, including holes 148b that receive pins 148a, which is one embodiment of the locking mechanisms for hinges 118 and 122. Another embodiment is physical stops that prevent the hinges 118 and 122 from rotating more than the 270 degree and 90 degree angles, respectively, as indicated in FIG. 8. Also depicted is more detail in regard to the gripping structures 126 that extend downward from the landing platform 124. In addition, FIG. 10 provides a view of teeth 150 that extend outward from the landing platform 124, and which can be used to break through obstructions, such as a window, or drywall or plaster and lathe between floors.

In some embodiments, the ramp 100 when extended (as depicted in FIG. 1) is about twenty inches wide, less than about three inches thick, and about twelve feet long, and the ramp 100 when folded (as depicted in FIG. 2) is about twenty inches wide, less than about nine inches thick, and about three feet long. In some embodiments, the ramp 100 is formed of at least one of aluminum, titanium, and rigid composite materials, and the hinges 106, 118, and 122 are formed of at least one of titanium and steel. In some embodiments, the ramp 100 weighs no more than about fifty pounds, and can hold a load of up to about four hundred pounds.

In some embodiments, the surfaces of the ramp 100 are formed with holes that provide a variety of functions. For example, the holes make the ramp 100 lighter by removing material, allow for drainage off the surfaces of the ramp 100, and provide for increased traction. In some embodiments, there is a lip that runs along either side of the ramp 100, in which the locks 138 and 140 are disposed, and into which the upper and lower extension arms 130 and 116 are retracted. The box shape of the lips also helps provide structural support when the ramp 100 is extended. In some embodiments lights are provided at the landing section 144, so as to illuminate the upper level 136 to which access is desired. A power supply built into the ramp 100, or a power supply conduit such as an electrical cord, are provided in some embodiments to power the lights.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A ramp having an upper surface and a lower surface, the ramp comprising:
   a main section, comprising,
      an upper section having a hinged end and a distal end,
      a lower section having a hinged end and a distal end, and
      a hinge connecting the hinged end of the upper section to the hinged end of the lower section, the hinge constructed such that the upper and lower sections can be folded together in a substantially parallel configuration, with the lower surfaces of the upper and lower sections facing one another, and the upper and lower sections cannot be folded together such that the upper surfaces of the upper and lower sections form less than a one hundred and eighty degree angle, and
   a landing section, comprising,
      a riser section having a first end and a second end,
      a first hinge connecting the first end of the riser section to the distal end of the upper section, the first hinge constructed such that the riser and upper sections can be folded together in a substantially parallel configuration, with the lower surfaces of the upper and riser sections facing one another,
      a landing platform having a first end and a second end, and gripping structures depending from the lower surface of the landing platform, and
      a second hinge connecting the second end of the riser section to the first end of the landing platform, the second hinge constructed such that the riser and landing platforms can be folded together in a substantially parallel configuration, with the lower surfaces of the retaining and riser sections facing one another, the second hinge having a lock to retain the retaining and riser sections in a desired angular position.

2. The ramp of claim 1, further comprising a lower extension section having a first end and a second end, with the second end of the lower extension section slidably connected to the distal end of the lower section such that the lower extension section slides out from the lower section, such that when the lower extension section is extended, the total length of the lower section and the lower extension section is about twice the length of the lower section alone, and when the lower extension section is retracted, the total length of the lower section and the lower extension section is about the length of the lower section alone, the lower extension section having a lock that engages the lower section for retaining the lower extension section at a desired length of extension from the lower section.

3. The ramp of claim 1, further comprising an upper extension section disposed between the upper section and the landing section, the upper extension section having a first end and a second end, with the first end of the upper extension section slidably connected to the distal end of the upper section such that the upper extension section slides out from the upper section, such that when the upper extension section is extended, the total length of the upper section and the upper extension section is about twice the length of the upper section alone, and when the upper extension section is retracted, the total length of the upper section and the upper extension section is about the length of the upper section alone, the upper extension section having a lock that engages the upper section for retaining the upper extension section at a desired length of extension from the upper section, the second end of the upper extension section connected by the first hinge to the landing section.

4. The ramp of claim 1, further comprising lower extension arms having first ends and second ends, with the second ends of the lower extension arms slidably connected to the distal end of the lower section such that the lower extension arms slide out from the lower section, such that when the lower extension arms are extended, the total length of the lower section and the lower extension arms is about twice the length of the lower section alone, and when the lower extension arms are retracted, the total length of the lower section and the lower extension arms is about the length of the lower section alone, the lower extension arms having a lock that engages the lower section for retaining the lower extension arms at a desired length of extension from the lower section.

5. The ramp of claim 1, further comprising upper extension arms disposed between the upper section and the landing section, the upper extension arms having first ends and second ends, with the first ends of the lower extension arms slidably connected to the distal end of the upper section such that the upper extension arms slide out from the upper section, such that when the upper extension arms are extended, the total length of the upper section and the upper extension arms is about twice the length of the upper section alone, and when the upper extension arms are retracted, the total length of the upper section and the upper extension arms is about the length of the upper section alone, the upper extension arms having a lock that engages the upper section for retaining the upper extension arms at a desired length of extension from the upper section, the second end of the upper extension arms connected by the first hinge to the landing section.

6. The ramp of claim 1, further comprising feet connected to the distal end of the lower section, the feet constructed such that they can rotate to an angle between the ramp and a surface on which the feet rest, the feet having gripping structures to grip the surface, the gripping structures including at least one of spikes, pads, claws, teeth, and combinations of such.

7. The ramp of claim 1, wherein the hinge between the upper and lower sections has a lock to retain the upper and lower sections in a desired angular position.

8. The ramp of claim 1, wherein the gripping structures of the landing platform further comprise at least one of spikes, pads, claws, teeth, and combinations of such.

9. The ramp of claim 1, further comprising rigid teeth extending outward from the second end of the landing platform.

10. The ramp of claim 1, wherein the ramp when extended is about twenty inches wide, less than about three inches thick, and about twelve feet long, and the ramp when folded is about twenty inches wide, less than about nine inches thick, and about three feet long.

11. The ramp of claim 1, wherein the sections of the ramp are formed of at least one of aluminum, titanium, and rigid composite materials, and the hinges are formed of at least one of titanium and steel.

12. The ramp of claim 1, wherein the ramp weighs no more than about fifty pounds.

13. The ramp of claim 1, wherein the ramp can hold a load of up to about four hundred pounds.

14. A ramp having an upper surface and a lower surface, the ramp comprising:
a main section, comprising,
an upper section having a hinged end and a distal end,
a lower section having a hinged end and a distal end, and
a hinge connecting the hinged end of the upper section to the hinged end of the lower section, the hinge constructed such that the upper and lower sections can be folded together in a substantially parallel configuration, with the lower surfaces of the upper and lower sections facing one another, and the upper and lower sections cannot be folded together such that the upper surfaces of the upper and lower sections form less than a one hundred and eighty degree angle,
a lower extension section having a first end and a second end, with the second end of the lower extension section slidably connected to the distal end of the lower section such that the lower extension section slides out from the lower section, such that when the lower extension section is extended, the total length of the lower section and the lower extension section is about twice the length of the lower section alone, and when the lower extension section is retracted, the total length of the lower section and the lower extension section is about the length of the lower section alone, the lower extension section having a lock that engages the lower section for retaining the lower extension section at a desired length of extension from the lower section,
lower extension arms having first ends and second ends, with the second ends of the lower extension arms slidably connected to the first end of the lower extension section such that the lower extension arms slide out from the lower extension section, such that when the lower extension arms are extended, the total length of the lower extension section and the lower extension arms is about twice the length of the lower extension section alone, and when the lower extension arms are retracted, the total length of the lower extension section and the lower extension arms is about the length of the lower extension section alone, the lower extension arms having a lock that engages the lower extension section for retaining the lower extension arms at a desired length of extension from the lower extension section,
feet connected to the first ends of the lower extension arms, the feet constructed such that they can rotate to an angle between the ramp and a surface on which the feet rest, the feet having gripping structures to grip the surface, the gripping structures including at least one of spikes, pads, claws, teeth, and combinations of such,
an upper extension section having a first end and a second end, with the first end of the upper extension section slidably connected to the distal end of the upper section such that the upper extension section slides out from the upper section, such that when the upper extension section is extended, the total length of the upper section and the upper extension section is about twice the length of the upper section alone, and when the upper extension section is retracted, the total length of the upper section and the upper extension section is about the length of the upper section alone, the upper extension section having a lock that engages the upper section for retaining the upper extension section at a desired length of extension from the upper section, upper extension arms having first ends and second ends, with the first ends of the upper extension arms slidably connected to the second end of the upper extension section such that the upper extension arms slide out from the upper extension section, such that when the upper extension arms are extended, the total length of the upper extension section and the upper extension arms is about twice the length of the upper extension section alone, and when the upper extension arms are retracted, the total length of the upper extension section and the upper extension arms is about the length of the upper extension section alone, the upper extension arms having a lock that engages the upper extension section for retaining the upper extension arms at a desired length of extension from the upper extension section, and a landing section, comprising, a riser section having a first end and a second end, first hinges connecting the first end of the riser section to the second ends of the upper extension arms, the first hinges constructed such that the riser section and upper extension arms can be folded together in a substantially parallel configuration, with the lower surfaces of the riser section and the lower extension arms facing one another, the first hinges having a lock to retain the upper extension arms and riser section in a desired angular position, a landing platform having a first end and a second end, and gripping structures depending from the lower surface of the landing platform, and a second hinge connecting the second end of the riser section to the first end of the landing platform, the second hinge constructed such that the riser and landing platforms can be folded together in a substantially parallel configuration, with the lower surfaces of the retaining and riser sections facing one another, the second hinge having a lock to retain the retaining and riser sections in a desired angular position.

15. The ramp of claim 14, wherein the hinge between the upper and lower sections has a lock to retain the upper and lower sections in a desired angular position.

16. The ramp of claim 14, wherein the gripping structures of the landing platform further comprise at least one of spikes, pads, claws, teeth, and combinations of such.

17. The ramp of claim 14, further comprising rigid teeth extending outward from the second end of the landing platform.

18. The ramp of claim 14, wherein the ramp when extended is about twenty inches wide, less than about three inches thick, and about twelve feet long, and the ramp when folded is about twenty inches wide, less than about nine inches thick, and about three feet long.

19. The ramp of claim 14, wherein the sections of the ramp are formed of at least one of aluminum, titanium, and rigid composite materials, and the hinges are formed of at least one of titanium and steel.

20. The ramp of claim 14, wherein the ramp weighs no more than about fifty pounds.

* * * * *